(12) United States Patent
Blair et al.

(10) Patent No.: US 6,778,528 B1
(45) Date of Patent: Aug. 17, 2004

(54) DIAL-OUT WITH DYNAMIC IP ADDRESS ASSIGNMENT

(75) Inventors: Dana Blair, Alpharetta, GA (US);
Michael Shannon, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/574,568

(22) Filed: May 17, 2000

(51) Int. Cl.[7] .............................................. H04L 12/66
(52) U.S. Cl. ...................................... 370/352; 370/475
(58) Field of Search ................................ 370/351–357, 370/366, 389, 392, 393, 395.21, 395.5, 395.54, 400, 401, 465–467, 474–476; 709/227–229, 230, 238

(56) References Cited

U.S. PATENT DOCUMENTS

| 5,790,548 | A |   | 8/1998 | Sistanizadeh et al. |
| 5,812,819 | A | * | 9/1998 | Rodwin et al. ............... 703/23 |
| 5,870,562 | A |   | 2/1999 | Butman et al. |
| 5,922,049 | A |   | 7/1999 | Radia et al. |
| 6,333,931 | B1 | * | 12/2001 | LaPier et al. ............... 370/385 |
| 6,496,511 | B1 | * | 12/2002 | Wang et al. ................. 370/401 |
| 6,594,254 | B1 | * | 7/2003 | Kelly .......................... 370/352 |
| 2002/0091850 | A1 | * | 7/2002 | Perholtz et al. ............. 709/231 |

* cited by examiner

*Primary Examiner*—Chi Pham
*Assistant Examiner*—Anh Vu Ly
(74) *Attorney, Agent, or Firm*—Hickman Palermo Truong & Becker LLP

(57) ABSTRACT

Packet network addresses, such as Internet Protocol addresses, may be assigned dynamically to computer systems accessed from the packet network by dial-out calls through a telephone network. A dial-out destination system will have an assigned name, typically a domain name. In response to a request for translation of the name, a network access server capable of reaching the destination obtains or assigns an address on a temporary basis. The network access server initiates the call to the destination system through the telephone network. The system initiating communication to the destination system uses the assigned address in any subsequent packet data communications. When the communication ends, the address is again available for a new assignment. This approach provides a dynamic address assignment technique for use on dial-out access services.

20 Claims, 4 Drawing Sheets

DIAL-OUT WITH DYNAMIC IP ADDRESS ASSIGNMENT

FIELD OF THE INVENTION

The present invention relates to a technique for dynamically assigning addresses, for packet switched data communications, to data devices accessed by a dial-out service from the packet network.

BACKGROUND

Data communication, particularly to and from the public network commonly referred to as the Internet is rapidly becoming a ubiquitous aspect of modern life throughout business, academic, educational and home environs. Today, the most common paradigm for access to a packet network, such as the Internet or a private intra-net, involves a dial-up procedure.

A user subscribes to network access services through an Internet Service Provider (ISP). The ISP operates pools of modems coupled to lines of the public switched telephone network. Typically, a pool of modems connects to a group of lines forming a multi-line hunt group, which is assigned one main telephone number. Users' computers dial the main number, and the telephone network connects each of the incoming calls to a line to the next available modem in the pool. Each user's computer typically includes a modem or an ISDN card. The user's modem modulates data from the user's computer for transmission in the voice telephone band over the telephone connection, where the modem from within the pool demodulates data signals for transmission over the packet switched data network. Similarly, the modem from the pool modulates data for transmission over the telephone link, where the user's modem demodulates the packet data for processing within the user's computer. This telephone-based operation provides the modem a unique power, the necessary connections are virtually ubiquitous. Such modems can communicate via virtually any telephone line or wireless telephone (e.g. cellular) to any other such telephone connection, virtually anywhere in the world.

Most often, data is transferred using Transmission Control Protocol/Internet Protocol (TCP/IP) implemented over such protocols as the Point-to-Point Protocol (PPP) or Serial Line IP (SLIP). PPP and SLIP allow clients to become part of a TCP/IP network (such as the Internet) using the public telephone network. To communicate via any packet switched data network, each device must have a packet protocol address. In the common forms of such networks, today, each address is an Internet Protocol (IP) address.

In the dial-in service, the IP addresses are administered through the ISPs. To an ISP, the available IP addresses are a limited resource. Accordingly, each ISP prefers to assign IP addresses on a dynamic basis, only to those users actually on-line at any given time. ISPs offering dial-in access to the Internet therefore use IP address pooling to enable the assignment of IP addresses to callers as they reach the Internet. Typically, as part of the dial-in service, the user's modem and the modem in the ISP pool conduct an initial handshaking, to establish data communications between the two modems. As part of this operation, the ISP host computer initiates a procedure to assign the user's computer a numeric Internet Protocol (IP) address from the pool of available addresses. When the session ends and the user goes off-line, the ISP host can reassign the address to another user, as the next user comes on-line.

This dynamic assignment of IP addresses upon dial-in connection allows the ISP to limit the number of IP addresses used to the number of users actively connected through the ISP's host to the Internet. This approach works efficiently for dial-in access, because data communications to/from the user's computer do not begin until there is a connection through the ISP host, and the host assigns the necessary IP address at that time when the user first needs such an address.

Recently, there has been increasing interest in Internet services, in which a gateway device dials-out to establish a link from an edge of the packet data network through the telephone network to a user's computer in the home or office. The dial-out link may enable a server on the Internet to provide a push-service, for example to supply e-mail or other data to a user's personal computer. As another example, the dial-out link may enable occasional access to a remote web server, where the usage is low and the operator of the server does not want to pay the costs of an always-on link to the Internet. Also, voice telephone services over the Internet are quickly becoming popular. To emulate the ubiquitous telephone service, such voice-over-IP services will require dial-out capabilities from the data network to destination computer stations. In practice, a computer already on the Internet requests the gateway device to initiate the outbound call to the destination computer. Typically, the gateway includes one or more modems for dialing the telephone number of the destination device and establishing modem to modem communications similar to those in the more common dial-in service. However, the administration and usage of the packet addresses presents certain problems.

To send a data packet over an IP packet network, the source must know its own address plus the address of the destination. In most existing services, the destination device is virtually always on-line and has a permanently assigned IP address. An originating device either knows the IP address, or the originating device obtains the numeric IP address from some third party source on the network, such as a domain name server.

In existing dial-out type service, this means that the computer seeking communication with the off-net device accessible only through an on-demand telephone call must know an IP address assigned to the off-net device. Although the called user does not have a connection that is on all the time, the originating device needs to know the IP address of the destination in order to initiate communications through the IP packet network. The present approach to dial-out services uses static address assignment. If the ISP equipment can initiate a dial-out call to a particular data device, that data device must have been permanently assigned its own IP address, for recognition by the ISP equipment and use by the parties initiating communications to that data device. However, with a dial-out service where many destinations may not be on at any given time this creates a severe resource problem with regard to allocation of IP addresses.

Clearly a need exists for systems and methodologies which enable packet switched communications to a destination device, requiring an dial-out operation, where the destination does not have a permanently assigned packet network address. It must be possible to initiate communications, including the dial-out operation of calling the destination before or concurrently with dynamic assignment of an address to the destination. Any technique for dynamically assigning addresses for the dial-out access service should require little or no modification in existing operations of the computer system seeking to communicate with the destination.

DISCLOSURE OF THE INVENTION

The invention addresses the above stated needs and overcomes the stated problems by providing a dynamic assignment of a packet network address during the initiation of a dial-out link, from a network access server to a destination computer system. The assignment and the dial-out operation are initiated as part of a name translation, and the outcome of the translation returns the dynamically assigned address.

In preferred inventive embodiments, the destination has a domain name, but not an IP address. When a source system attempts to communicate with the destination, the source system sends a domain name query, with the destination name, to a domain name server. The server in turn contacts the network access server providing the dial-out access service to the destination computer system. The network access server obtains or assigns an IP address to the destination. At about the same time, the network access server initiates the telephone call to the destination system. The address is supplied to the source system, and that system utilizes the temporarily assigned IP address to communicate IP packets to/from the destination via the packet network, the network access server and the link through the telephone network.

Aspects of the invention relate to systems and software products for performing the necessary functions in dynamically assigning addresses on dial-out access services, as implemented in the network access server, the destination system and the domain name server.

For example, a first aspect of the invention relates to a network access server, which includes a packet network interface and a telephone network interface. A programmable controller, coupled to the network interfaces, controls communications through the network access server via the interfaces. A memory stores program code executable by the controller. The network access server receives a name translation query, via the packet network interface, for a name associated with a destination computer system accessible from the network access server via the switched telephone network. In response, the network access server establishes a dial-out link to the destination computer system and initiates data communication. The network access server temporarily assigns a packet network address to the destination computer system, from among a pool of addresses available to the network access server. The network access server sends a response to the query via the packet network interface. The response contains the temporarily assigned packet address as a translation of the name.

The response message may go directly to a system that requested a translation of a domain name or the like. Preferably, the network access server receives the query from a translation server, such as a domain name server; and the network access server sends the response message to the translation server. The translation server, in turn, forwards the destination address for use by the system that originally requested the translation.

If the destination system is essentially a single computer, the network access server also supplies the assigned address to the destination computer. The requesting system and the destination system use that address in subsequent communications via the packet network, the network access server and the telephone link. Some destination systems, however, may comprise a group of computers linked by a local data network. In such a case, if the intended destination node within the local network has a private address, the network access server may translate between the assigned address and the packet address.

Other aspects of the invention relate to a system and software product for use at the destination. In this regard, the destination system answers an incoming call over the telephone link and initiates data communication. The destination system negotiates with a calling network access server, to obtain a temporarily assigned address for packet data communications. The system conducts packet data communications via the telephone link and the network access server using the temporarily assigned address.

Other aspects of the invention relate to a system and software product for use in the domain name server. In operation in accord with this invention, the domain name server receives a translation query containing a domain name, via a packet switched data network. The server recognizes that the received domain name relates to a destination system accessible via a dial-out link through a telephone network. The domain name server sends a message, containing the received domain name, through the packet switched data network to a network access server. The domain name server sends this message to a particular network access server that is capable of establishing the link through the telephone network to the destination system. The domain name server subsequently receives a packet network address, temporarily assigned to the destination system, from the network access server. The temporarily assigned packet network address is supplied in a response message to a source of the translation query, via the packet switched data network.

In a preferred embodiment, the domain name server updates a translation record corresponding to the received domain name to include the packet network address temporarily assigned to the destination system, when the server receives the address from the network access server. The domain name server then can make direct translations from the name to the temporary address. The domain name server deletes the address later, in response to receipt of a message via the packet switched data network indicating that the assignment to the destination is no longer valid, for example when the destination system goes off-line.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations. In the figures, like reference numerals refer to the same or similar elements.

DETAILED DESCRIPTION OF THE PREFERRED EMBODIMENTS

The invention involves a request for translation of a name for the destination system into a packet network address, for the destination system. However, instead of a direct translation in response to the request, a translation to a dynamically assigned address is necessary, to enable communication with a destination accessed via a dial-out link through a telephone network. In response to a translation request, a translation server therefore contacts a network access server capable of initiating the dial-out call to the destination system. The network access server initiates the call to the destination system through the telephone network. At approximately the same time, the network access server assigns an address from a pool of available addressees. Alternatively, the network access server interacts with an associated accounting server to obtain and assign the address for temporary use by the destination system. At least the source and possibly the destination system receive the assigned address and use that address in any subsequent communications, for the destination system, over the packet data network.

Clearly, this approach provides a dynamic address assignment technique for use on dial-out access services. The incorporation of the address assignment into the name translation processing allows use of the dynamically assigned addresses without requiring that the system initiating the communication know that the destination requires dial-out access. Typically, the operations of the source or client system need not be modified in order to obtain the address. From the source perspective, the system only requests a translation and receives a valid address for its use as a destination address.

Figure 1:
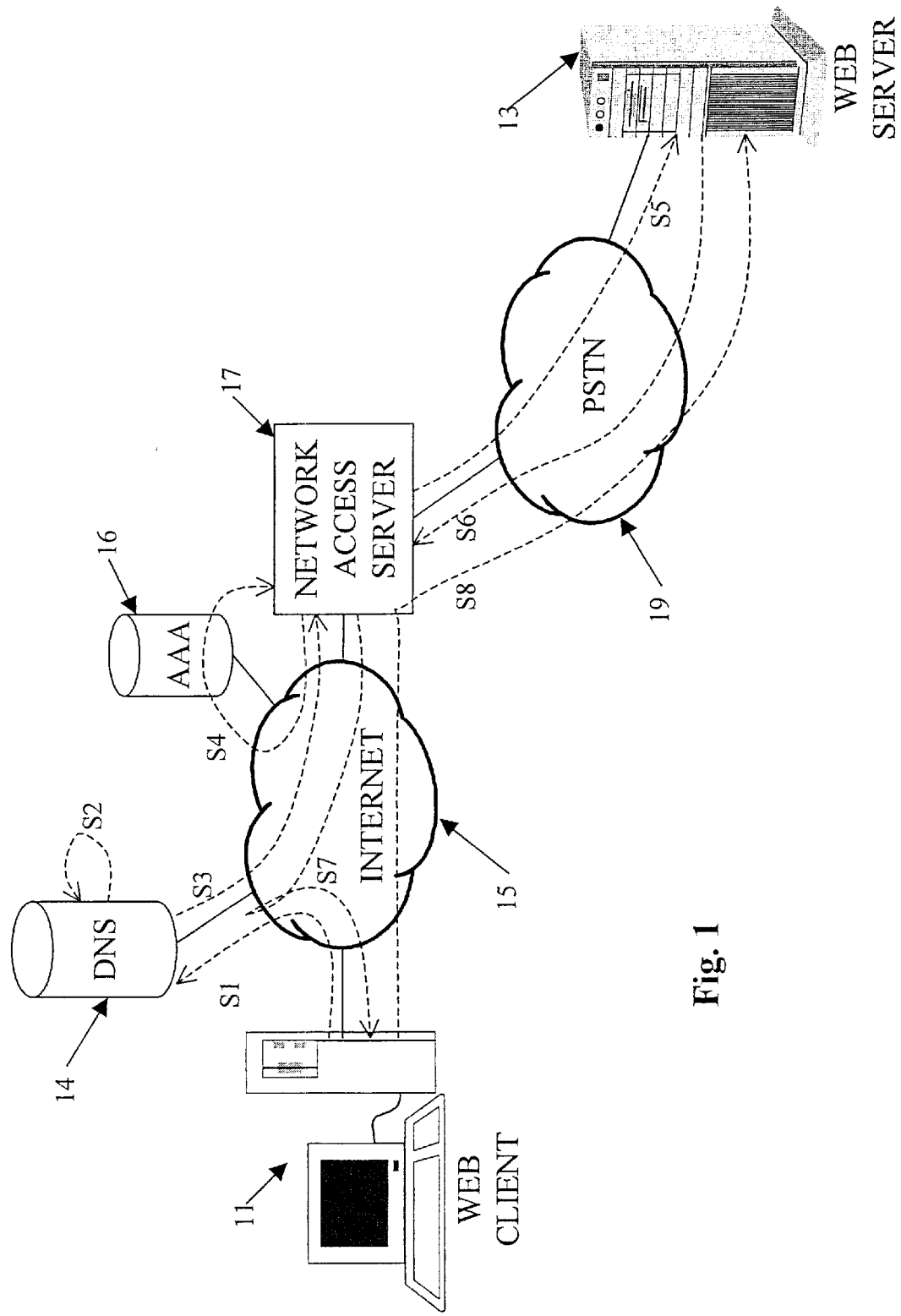
FIG. 1 is a simplified block diagram of networks, servers and computer systems implementing dynamic packet address assignments for dial-out access services, in accord with a first embodiment of the invention.

FIG. 1 is a simplified block diagram of the networks and computer systems that implement a first embodiment of the inventive dynamic address assignment for dial-out access services. In FIG. 1, a first computer system 11 is essentially a source, seeking to initiate a communication with a particular destination computer system 13. The drawing shows a client computer as an example of the source. The source connects to a wide area packet switched data communication network, such as the worldwide public data network commonly known as the Internet 15. The connection to the Internet 15 may utilize any available physical linkage, for example over a local area network and router port, a digital subscriber line or T1 link to an ISP, dial-up access through an ISP, etc.

A network access server (NAS) 17 or similar gateway device provides data communication and Internet access service for the destination system, in the example a web server 13, through the public switched telephone network (PSTN) 19. In this embodiment, the destination system appears as a single computer. A later embodiment provides the dial-out service for a destination system that comprises a system of computers linked via a private data network. The NAS may provide dial-in access in the normal manner. For purposes of discussion of the invention, the NAS 17 also offers a dial-out service, to initiate a call through the PSTN 19 and data communications to/from the destination system 13.

The source system 11 will have its own packet address, in the example, its own IP address, for use in sending and receiving communications through the network 15. The source address may be static or dynamically assigned in a known manner. To communicate with the destination system 13, the source system 11 also needs the packet address of the destination, in this case an IP address for the computer system 13.

Rather than utilize the numeric IP addresses, many instances arise where it is easier to utilize a textual "domain name" for addressing. A domain name system (DNS) server, such as the DNS server 14, provides a translation between a textual name of a standard format assigned to the destination and a standard numeric IP packet address. In the inventive dial-out access service, however, the actual IP address of the destination may not be known at the time when the source system 11 first needs to know that address.

The invention is applicable to any source system 11 seeking to communicate with a destination computer system 13 using IP communications and a dial-up link from an ISP or the like on the Internet 15 to the destination computer system 13. Examples of the source include client browsers such as the illustrated web client, but the source device could be any device using a domain name look-up to route to a destination through the Internet 15. Similarly, the destination device 13 may be a web server as shown, another standalone client computer, a private network of computers, or any other device or devices capable of receiving IP packet communications.

In accord with the invention, the domain name translation will entail a dynamic assignment of an address to the off-net destination, establishment of a dial-up link to the destination system 13 and return of a translation result to the source 11. In this case, the translation result will include the dynamically assigned address. Source users can utilize a name-to-address translation, for example, from domain name to IP address, to allow more convenient textual addressing in essentially the normal manner from the source perspective. In many cases, however, the name translation service also enables translations from permanently assigned textual names to dynamically assigned numeric addresses for IP communications.

The domain name system (DNS) server 14 coupled to the Internet 15 normally correlates domain names to statically assigned IP addresses. The server 14 may also provide translations to addresses dynamically assigned to systems accessing the Internet through the common dial-in ISP services. In accord with the invention, that same server will recognize when there is no actual address available and obtain a dynamically assigned IP address through interaction with the NAS 17 providing the dial-out access service to the named destination 13.

As illustrated, the NAS 17 has access to an authentication, authorization and accounting (AAA) server 16, which provides a database of passwords and user records, for example indicating what services a user is entitled to receive. One example of an AAA server is a RADIUS server. Upon request from the NAS 17, the AAA server 16 supplies an account record for an identified user. The record, for example, may be accessed based on identification of a call-in user by personal identification number (PIN) or the like during a log-in for dial-up access. For the inventive dial-out service, the NAS 17 and the AAA server 16 will utilize the domain name of the destination, taken from a name translation request that the NAS 17 received from the DNS server 14.

The AAA server 16 and the NAS 17 also control a pool of IP addresses for users operating through the NAS. These addresses are dynamically assigned to users' systems on an as-needed basis, as the systems connect to the Internet 15 through the NAS. When users' systems go off-line, the allocated addresses are returned to the pool for future re-assignment. In accord with the invention, it is possible to dynamically assign an IP address to the destination system 13, as part of the dial-out access procedure. The address may be assigned before the NAS establishes communication with the destination computer. Alternatively, the address could be assigned after the NAS and the destination link-up. Upon such assignment to a dial-out destination system 13, the NAS 17 supplies the address to the source computer system 11, either directly or preferably through communication with the DNS server 14. In the embodiment of FIG. 1, the NAS 17 also sends the assigned IP address to the destination computer system 13, for its use in subsequent IP communications.

Figure 2:
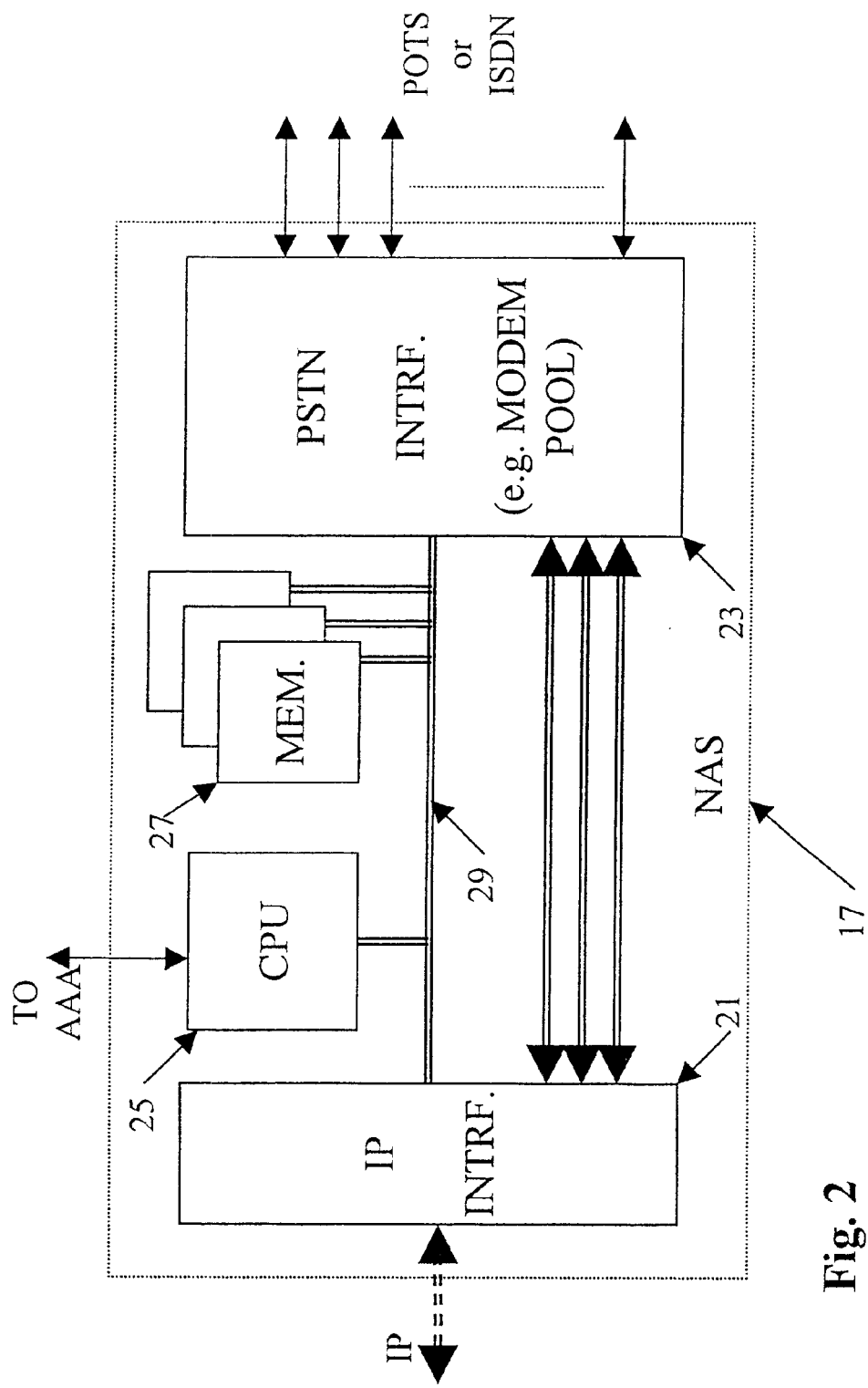
FIG. 2 is a simplified block diagram of the elements of a network access server useful in implementing the invention as in FIG. 1.

FIG. 2 is a simplified/generic illustration of the elements of a gateway device, such as a NAS 17, implementing the dynamic assignment of packet addresses in dial-out access services, in accord with the invention.

In its simplest form the gateway or NAS 17 may comprise an IP interface 21, a PSTN interface 23 and a central processing unit (CPU) 25 for control of communications through the interfaces. The IP interface 21 provides a connection to a packet switched link to the Internet 15. The IP interface 21 may function as an IP packet router. Alternatively, the interface 21 may support any of a variety of lower level data communication protocols to transport the IP packets over the link to and from the Internet, such as Ethernet, SMDS or ATM.

A preferred embodiment of a NAS 17, which is available from Cisco, connects through two Primary Rate Interface (PRI) type ISDN circuits from a central office switch of the PSTN 19. Within the preferred NAS 17, the PSTN interface 23 takes the form of a bank of interface cards, including modem type processing circuitry for handling analog modem calls as well as a high level data link control (HDLC) protocol controller for ISDN digital calls.

The interfaces 21 and 23 are coupled together, to exchange IP packet data for communications between the Internet 15 and data devices communicating via the PSTN 19. The NAS may offer users accessing the Internet via PSTN links a point-to-point protocol (PPP) type access point for transport of Internet Protocol (IP) communications. The NAS may implement any one or more of the other protocols known for access via a telephone network.

The NAS 17 includes one or more memory devices 27, for use by the CPU during operation and control of the interfaces 21, 23. The CPU 25 communicates with the interfaces 21, 23 and with the memories 27 via an interconnect bus system 29. The data communications between the IP interface 21 and the PSTN interface 23 may ride on the interconnect bus 29 or utilize one or more separate physical paths within the NAS.

The memories 27 typically include a random access main memory, a read only memory and cache memory. The memories 27 may also include one or more mass storage devices such as various disk drives, tape drives, etc. In operation, the main memory stores at least portions of instructions and data for execution by the CPU 25, but copies of all or portions of such information may reside in other memories.

FIG. 2 also shows a link from the CPU 25 going to/from the AAA server. The illustrated link is a logical link, not necessarily a physical connection. The NAS 17 could connect directly to the AAA server 16, but preferably the CPU 25 of the NAS communicates with the AAA server via IP communications through the interface 21 and the Internet 15 (see FIG. 1).

An aspect of the invention relates to a software product comprising a machine-readable medium and executable code carried by that medium. The code, executable by the CPU or other processor of the network access server 17 is stored in one or more of the memories 27 and uploaded into main memory of the server 17 for execution. Execution of the programming by the CPU 25, operates the NAS 17 so as to offer a number of Internet access services and perform various related functions. Preferably, the NAS will offer dial-in Internet access services in essentially the normal manner. However, in accord with an aspect of the invention, the software causes the NAS to perform dial-out operations with dynamic address assignment, as well.

In this regard, the NAS software includes a routine for execution upon receipt of a domain name translation request. The CPU 25 recognizes from the translation request that an originating party, such as the web client 11, is attempting to communicate with a named destination device accessible through the dial-out access service and initiates execution of the appropriate routine. As part of that routine, the CPU 25 obtains a user record from the AAA server 16 corresponding to the domain name of the destination. The record includes a variety of information regarding the user account of the destination station. For purposes of discussion here, the record specifically includes a telephone number for dial-out access to the destination system 13 through the PSTN 19 and any parameters needed to initiate data communications through the PSTN with that destination system. The routine also causes the NAS 17 to obtain an available IP address from a pool available for use by the NAS and to temporarily assign that address to the destination computer system 13, for the duration of the current communication session. The CPU 25 supplies the telephone number of the destination to the PSTN interface 23, which seizes a link to the PSTN 19 and dials the destination number. The dialing, for example, may entail a tone dialing operation compatible with an analog telephone line or D-channel signaling over an ISDN link.

The software executed by the CPU 25 also controls a handshaking operation between the PSTN interface 23 and the destination computer system 13. Of particular note for purposes of discussion of the first embodiment, this handshaking will include informing the destination system 13 of the assigned IP address, for its use in future packet data communications during the telephone session. The software also causes the CPU 25 to compile an IP packet, in the form of a domain name translation response message and supply that message to the interface 21 for transmission over the Internet. Subsequently, the IP interface 21 will receive IP packets from the Internet containing the assigned address as a destination address. The interface 21 passes such packets to the PSTN interface 23 for modem or ISDN format transmission through the PSTN 19 to the destination system 13. In the opposite direction, the destination computer system 13 sends IP packets for Internet communication. In this embodiment, those packets include the assigned address as a source address. The PSTN interface 23 will recover such packets from the modem or ISDN format transmission through the PSTN and supply the packets to the IP interface 21 for transmission over the Internet 15.

Figure 3:
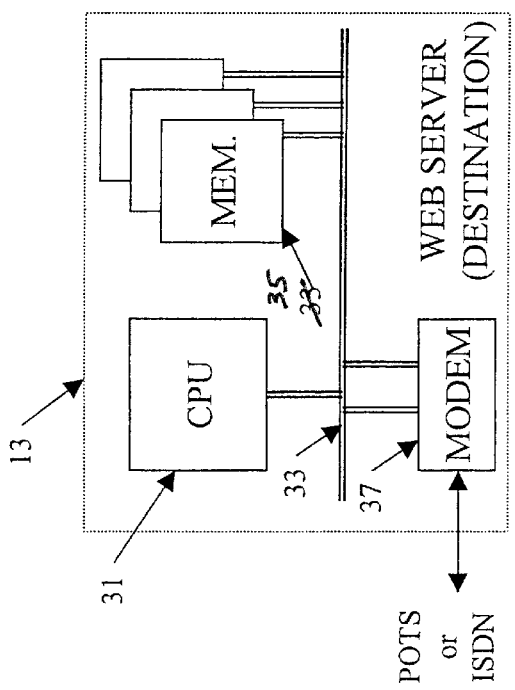
FIG. 3 is a simplified block diagram of the elements of a destination computer system, such as a web server, useful in implementing the invention as in FIG. 1.

FIG. 3 illustrates a high level block diagram of a general purpose computer system 13, which may be employed as the destination web server in the exemplary embodiment of FIG. 1. In this example, the system 13 is essentially a single computer although those skilled in the art will recognize that the system 13 may comprise more complex data systems.

The exemplary destination computer system 13 contains a central processing unit (CPU) 31, memories 35 and an interconnect bus 33. The CPU 31 may contain a single microprocessor, or may contain a plurality of microprocessors for configuring the computer system 13 as a multi-processor system. The memories 35 include a main memory, a read only memory, and mass storage devices such as various disk drives, tape drives, etc. The main memory typically includes dynamic random access memory (DRAM) and high speed cache memory. In operation, the main memory stores at least portions of instructions and data for execution by the CPU 31.

The mass storage may include one or more magnetic disk drives or optical disk drives, for storing data and instructions for use by CPU 31. The mass storage may also include one or more drives for various portable media, such as a floppy disk, a compact disc read only memory (CD-ROM), or an integrated circuit non-volatile memory adapter (i.e. PC-MCIA adapter) to input and output data and code to and from the computer system 13.

In the illustrated example, the computer system 13 is a standalone server and may not include other elements for providing a local user interface. In other applications, however, the computer system may be a personal computer or a workstation. As such, the system 13 may further include a graphics subsystem and an output display. The output display may include a cathode ray tube (CRT) display or liquid crystal display (LCD). Such an implementation of the system 13 would also include one or more input control devices, as part of the user interface for the system. Such user input control devices may include an alphanumeric keyboard for inputting alphanumeric and other key information, a cursor control device, such as a mouse, a trackball, stylus, or cursor direction keys. For some applications, such as voice over IP, the system 13 may include microphone(s), speaker(s) and an audio processing card for input and output of analog audio information to/from a user.

The system 13 also includes one or more input/output (I/O) interfaces for communications, shown by way of example as a modem 37. The destination computer system 13 may utilize other communication devices, such as an ISDN card. Of note for purposes of discussion here, the modem or ISDN card provides a telephone network interface for making and answering incoming calls and conducting data communications over the telephone link. The link preferably is a standard analog or ISDN telephone line, although other telephone media may be used, such as wireless telephone communication links.

The components contained in the computer system 13 are those typically found in general purpose computer systems used as servers, workstations, personal computers, network terminals, and the like. In fact, these components are intended to represent a broad category of such computer components that are well known in the art. The destination computer system 13 runs a variety of applications programs and stores data, enabling one or more interactions over the packet switched network. The system may make data access calls to an ISP device, such as the NAS 17, in the normal manner.

In accord with the invention, the software of the system 13 also causes that system to answer incoming data calls from the NAS 17 and initiate a data communication session, for interactive communications or the like over the Internet 15 or other packet switched network. The systems perform handshaking during initialization of the data communications between the NAS 17 and the modem 37 of the system 13. In this embodiment, the system 13 obtains a dynamically assigned IP address from the NAS. The handshaking and address assignment may utilize PPP or SLIP protocols, or any other appropriate protocol. The system 13 will utilize the assigned IP address as its own packet address, during all subsequent packet communications over the telephone link and the Internet, until the session is terminated.

The exemplary system 13 will obtain and utilize a newly assigned packet address from the NAS during each subsequent data session set up by the system 13 upon answering a call from the NAS 17. Each new address for a new session is arbitrarily assigned and may be the same as or different from any and all of the addresses temporarily assigned to the system 13 during earlier sessions.

An aspect of the invention relates to a software product comprising a machine-readable medium and executable code carried by that medium. The code, executable by the CPU processor of the computer system at the destination, controls the answering of the incoming data call through the telephone network and the subsequent handshaking to enable dynamic assignment of a packet address to the destination computer system 13.

When loaded into the computer system, the executable code and any associated data reside in one or more of the memories 35 associated with the CPU 31 of the system 13 and are loaded into working space in the main memory or registers within the CPU, as needed for operation. As such, one type of medium, which will bear the executable code of the product, comprises various physical storage media used in the computer system. Examples of this type of media include, RAM, ROM, cache memory, hard and floppy disk drives, JAZZ drives, ZIP drives, CD-ROM, data tape drives, semiconductor memories, PCMCIA cards, etc. The executable code and any associated data may be loaded from a network server into memory in the computer system. Other media that may bear the executable code include similar memory devices used in the computer system of such a network server operating as the download source as well as various scannable media enabling loading of the code into the network download server or directly into the computer system 13.

The software download from some type of network to the destination computer system 13 may utilize a transportable medium, such as a CD-ROM or floppy disk. Alternatively, the server may send the programming through a network, to download the code and associated data to the destination computer system 13. Such a download signal typically will travel through portions of the packet switched network 15, portions of the PSTN 19 and over the line or other telephone link to the computer system 13. Hence, another class of machine-readable medium encompasses optical, electrical, and electromagnetic signals or waves for carrying the code and associated data both on physical links and on wireless links.

Figure 4:
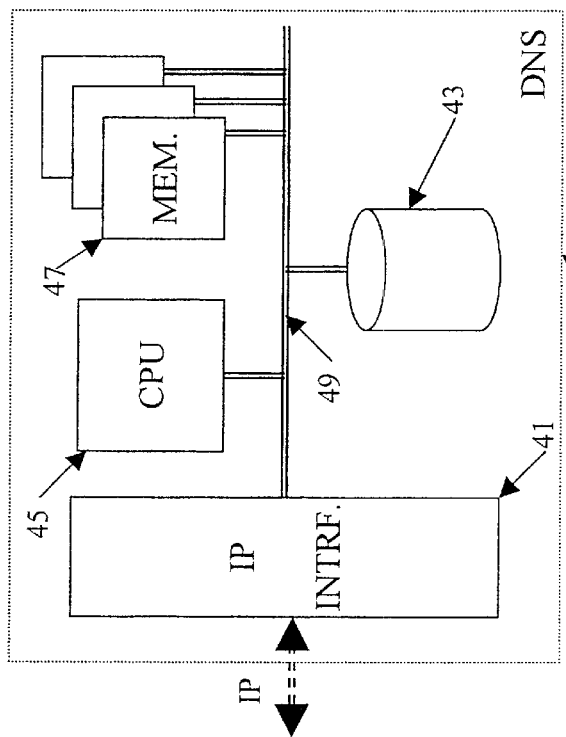
FIG. 4 is a simplified block diagram of the elements of a DNS server system useful in implementing the invention as in FIG. 1.

As noted earlier, an aspect of the invention relates to a software product for controlling operations of the NAS or other similar data network gateway. The code and data for controlling such a gateway may be carried on and transferred into the NAS in a fashion similar to that discussed above relative to the software utilized in the destination system. FIG. 4 is a simplified/generic illustration of the elements of a name translation server, such as the DNS server 14, useful in the dynamic assignment of packet addresses in dial-out access services, in accord with the invention. Such a server includes an IP interface 41 and a database 43 of translation tables. The tables in the database 43 provide translations between names, preferably in textual domain name format, and the packet addresses used on the network 15. In many cases, an individual record in these tables provides translation from a name to a static IP address. Some may provide translations to an address dynamically assigned during dial-in access. However, other records in the table relate to the inventive dial-out service.

The DNS server 14 also includes a central processing unit (CPU) 45, for control of server operations, and memories 47. An interconnecting bus 49 enables communications between elements of the DNS server system 14. The memories 47 include a random access main memory, a read only memory and cache memory. The memories 47 may also include one or more mass storage devices such as various disk drives, tape drives, etc. In operation, the main memory stores at least portions of instructions and data for execution by the CPU 45, and one or more of the memories 47 may actually store the translation tables of the database 43.

The IP interface 41 provides a connection to a packet switched link to the Internet 15, for two-way transport of IP packet messages in a manner similar to the IP interface 21 in the NAS discussed earlier. The DNS server 14 receives queries for domain name translations via the interface 41, and in some cases forwards queries to other nodes on the Internet 15 via that interface. The server also sends and receives responses through the Internet via the IP interface 41.

An aspect of the invention relates to a software product comprising a machine-readable medium and executable code carried by that medium, in this case executable by the CPU 45 or other processor of the server 14. The program is stored in one or more memories 47 and uploaded into main memory of the server 14 for execution. Execution of the programming by the CPU causes the server 14 to perform its normal DNS processing functions as well as the inventive functions relating to the translations to dynamically assigned IP addresses for dial-out access services.

For example, the software product enables the CPU 45 to process the translation records for dial-out destinations. Each of these records indicates that the destination system does not have an IP address associated with the domain name of the destination system 13. Each record has a flag set to indicate that the destination system 13 is a remote device, i.e. off-net.

The inventive software of the server causes the server to initiate the query procedure and obtain the dynamically assigned IP address from the NAS. The software may also cause the server 14 to update these records, to show the assigned address while a destination system is on-line and to restore the off-line form of the record when a dial-out session ends. The code and data for controlling a translation server, such as the DNS server 14, may be carried on and transferred into the server in a fashion similar to that discussed above relative to the software utilized in the destination system or the NAS.

The structure of the AAA server 16 may be generally similar to that of the DNS server 14. In such a case, the AAA server would simply run a different set of programs and maintain a different database, to perform the requisite authentication, authorization and accounting functions. The communications between the AAA server and the NAS would utilize the Internet 15. Alternatively, the AAA server may connect directly to or even be built into the NAS or equivalent gateway device.

The sequential operations and interactions of the systems and networks shown in FIGS. 1 to 4 will now be discussed in more detail. Depending on the services offered by the ISP operating the NAS 17, the NAS may offer dial-out services both with static addressing to a destination system as well as the inventive dynamic address assignment to a destination system. To assist in understanding of the invention, it may be helpful to consider examples of the operations involved with both types of destination address processing.

As a first example, assume that the destination is a web server 13 that uses a dial-up connection rather than an always-on link to the Internet 15. In this first example, assume also that the web server 13 has a permanently assigned address (e.g. x.x.x.x). The address is part of an IP address domain assigned to a particular NAS 17. Any data packet intended for the web server 13 must go through the particular NAS 17 assigned to serve that IP address. When a user of the web client system 11 types in a domain name www.name.com for the server 13, the client computer 11 sends a query containing the text form of the domain name to the DNS server 14 through the Internet 15. The DNS server 14 accesses its internal translation table and translates the domain name into a numeric IP address. The DNS server 14 sends a packet back to the client computer 11 containing the IP address for the web server 13.

The client computer 11 builds a packet with the IP destination address and sends that packet through the Internet 15 to the NAS 17. The NAS recognizes the IP address in the packet, and in response, the NAS 17 initiates a dial-out call through the PSTN 19 to the remote web server 13. When the web server 13 answers through its modem or ISDN card, a voice-grade PSTN connection has been established. The NAS 17 initiates a data communication through the PSTN with the web server computer 13 and sends the packet to the server. The web server 13 and the web client computer 11 can now exchange IP packets back and forth using the IP addresses for both computers.

As part of this process, it is possible that dial-out information is stored on the AAA server 16, and the NAS 17 may access information needed to initiate the call to the web server. For example, the NAS may obtain information regarding the permissions applied to the dialout user system regarding circumstances under which the NAS is allowed to initiate the dial-out connection and establish the PSTN link with the web server 13.

In an example of the invention, now assume that the destination server 13 has no statically assigned IP address. Consider again an example where the web client system 11 seeks to establish IP communication with the web server 13. One goal of the invention is to make everything transparent to the client, so that the client system 11 need not implement any new operations or in fact have any new software running on the source computer 11. When the web client user types www.name.com for the server 13, the client computer 11 again sends a query containing the text form of that domain name to the DNS server 14. This operation appears as a dotted line signifying the communication step, in FIG. 1. This step S1 is the same client computer operation as in the prior example using static destination addressing.

In the inventive dynamic address processing, the DNS server 14 again accesses its internal translation table (step S2), but now the DNS translation record preferably indicates that the destination does not have an IP address associated with the domain name of the destination system 13. The record also preferably includes a flag indicating that the destination system 13 is a remote device, i.e. off-net. Other record formats could be used, or certain activity could be triggered by an incomplete record or some failure to access a record, as an indication that the destination requires dial-out access.

In the presently preferred implementation, the DNS translation record in the server 14 will include an IP address for the NAS 17 serving the destination system 13. There may be a list of IP addresses assigned through the one or more NASs that can reach the remote. As an alternative, the DNS server could use an address of the AAA server 16 and communicate with that server to learn the address of the relevant NAS 17.

The DNS server 14 now sends a message to the NAS 17 (step S3). There is a hierarchy of DNS servers and a corresponding protocol for messages between such servers, to enable resolution of address translations between the servers when one but not all servers store the translation data for a particular name or address. When one DNS server can not resolve the address, it can send a query to another node on the Internet that can resolve the particular address translation. The inventive NAS 17 will include some DNS functionality in it. Accordingly, when the DNS server 14 can not resolve the translation request for the destination system 13 having dynamic addressing on dial-out access, the server 14 sends a DNS query to the NAS 17 through the Internet 15.

For addresses not defined locally, the DNS functionality of the NAS causes the NAS to go to the AAA server 16. The NAS 17 therefore sends the domain name to the AAA server 16, and the AAA server 16 retrieves and returns a record for the destination user (step S4). The record includes all information necessary to establish the link to the destination, in this example to the web server 13. For example, the record from the AAA server 16 includes the telephone number needed to call the web server through the PSTN 19.

A portion of the interaction between the NAS and the AAA server is essentially the same interaction as performed during initial Internet access using a dial-in service through the PSTN 19 and the NAS 17. The user record in the AAA server 16 typically includes other information regarding the services to which the user subscribers. Based on the user's subscription, for example, the record could block the dial-out operation by the NAS 17.

Assuming that the user record indicates that the call is within allowable service parameters, the NAS 17 now uses data from the AAA record to dial-out to the destination computer system 13 through the PSTN 19 (step S5). When the destination system 13 answers the data call from the NAS 17 (step S6), the NAS and the destination computer execute a PPP or SLIP communication or the like, to establish data communication. In this embodiment, part of this communication serves to inform the destination computer system 13 of its assigned IP address.

Assume for this discussion that the IP address is assigned as part of the PPP communications, i.e. when the destination system 13 comes on-line. The NAS 17 now knows the name and the IP address temporarily assigned to the destination system 13. The NAS 17 can now supply the address to the source system 13 that initially requested the domain name translation (step S7). The NAS may send the address resolution directly back to the source system 11, but preferably, the NAS sends the response message containing the assigned IP address back through the Internet 15 to the DNS server 14. The DNS server 14 in turn sends a response to the web client computer 11 with the IP address. To the web client computer 11, the entire process to this points appears as if that computer simply launched a DNS query to the server 14 and received a response with the destination address, exactly the same as in the static address translation example. The client computer 11 can now use that address to send one or more message packets through the Internet 15, the NAS 17 and the dial-up link through the PSTN 19 to the destination web server 13 (step S8) in the normal manner.

When the DNS server 14 receives the response message from the NAS 17, the DNS server may temporarily update its translation tables for the destination, to show the dynamically assigned address as a translation for the domain name of the web server 13. If the DNS server 14 receives a translation request for that domain name, it can directly translate that name to the dynamically assigned address. In this manner, other client systems may access the web server 13, in essentially the normal manner, while the web server 13 remains on-line through the NAS 17.

When the call between the web server 13 and the NAS 17 is taken down for any reason, the NAS recognizes this event and withdraws the address assignment to that user system. As part of this operation, the NAS 17 will return the address to the pool of available addresses for future use by the same or other user systems accessing the Internet through the NAS 17. The NAS preferably signals the DNS server 14 through the Internet 15, to inform that server that the address assignment is no longer valid. The DNS server 14 updates its translation table, to restore the entry for the domain name of the computer system 13 to its original "off-line" condition. Other procedures could be used to update the DNS translation tables to reflect temporary assignment of addresses and termination of such assignments.

In the processing embodiment discussed above, the destination computer system 13 essentially comprised a single computer and conducted only a single data session over the telephone link. This is the simplest case. However, many entities operate more complex systems that may serve as the destination. For example, the destination system may include a number of computers, e.g. linked by a network. If the node on that network providing the communication with the NAS utilized a dynamically assigned IP address, the operations of the invention would appear identical to the example discussed above relative to the embodiment of FIG. 1. An example of such a situation might arise where a firewall provides a modem link to a telephone line. The firewall would provide any necessary translations between the dynamically assigned IP address(es) supplied by the NAS and whatever addresses are used on the private network behind the firewall. To the NAS, the firewall presents an appearance directly analogous to the single computer web server in the earlier example or a plurality of such systems. The inventive address assignment technique, however, may be adapted to interact with multi-node destination systems having other types of local or private address administration.

Figure 5:
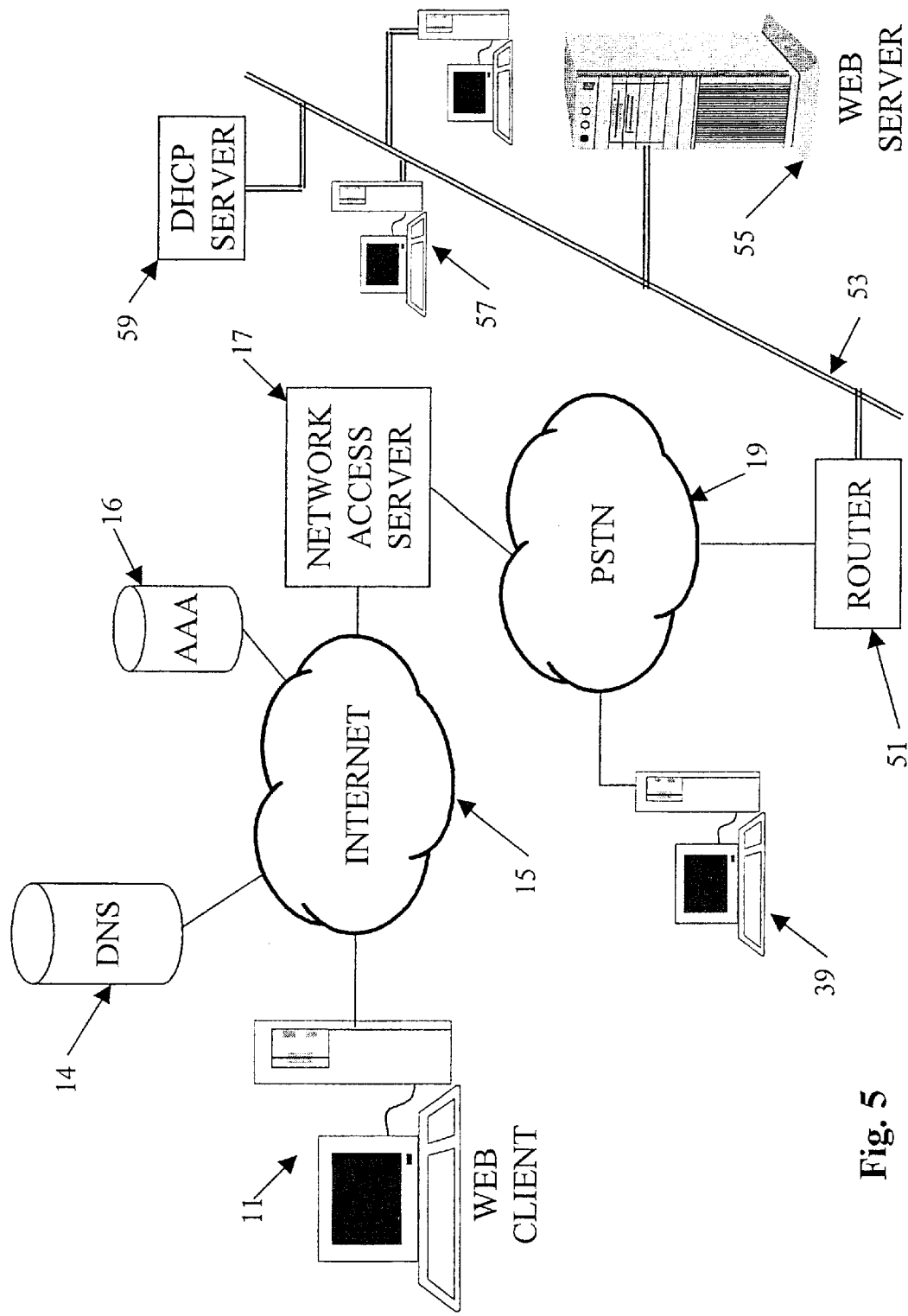
FIG. 5 is a simplified block diagram of networks and computer systems implementing dynamic packet address assignments for dial-out access services, in accord with a second embodiment.

FIG. 5 provides a block diagram, similar to that of FIG. 1, but useful in explaining another embodiment of the inventive dynamic address assignment technique. The source system, such as web client 11, the DNS server 14, and the AAA server 16 are the same as the similarly numbered elements in FIG. 1 and operate essentially as described above. The NAS 17 is structurally the same as that discussed above relative to FIGS. 1 and 2. The NAS will perform the same operations as discussed above, for example for dial-out access directly to a destination such as the computer system 39. However, this embodiment offers an alternate approach for addressing nodes within a local network type destination system.

In the example of FIG. 5, the software of the NAS 17 also enables the NAS to offer the same dynamic IP address management for destination systems on a (LAN), for example behind a dial-up router 51. The router 51 is dynamically assigned an IP address through the operations of the NAS 17 and the AAA server 16, as part of the domain name resolution processing.

The LAN 53 provides private data communications for a number of computer systems 55, 57. For this discussion, assume that the system 55 is a web server similar to the server 13 discussed earlier, except that instead of its own modem, the server 55 includes an appropriate interface card for communication via the LAN 53. The router 51 includes one or more modems enabling devices 55, 57 on the LAN 53 to access the Internet 15 through the PSTN 19 and the NAS 17.

Each computer system 55 or 57 operating on the LAN 53 needs an IP address in order to communicate. Each such device may use the IP address for internal communication and/or for communications using an external packet-switched network such as the Internet 15. Typically, each device on the network will have a physical layer address compatible with the transport mechanisms of the particular type of LAN, such as a MAC (media access control) address for Ethernet. Such physical addresses are permanently associated with the physical circuitry of the devices. However the IP addresses may or may not be permanently assigned within the LAN environment. If permanently assigned, some networks provide domain name translations to such addresses.

The LAN could provide static IP addressing, and the LAN may offer an internal domain name-to-IP name translation through a DNS server (not shown). The most difficult case for dynamic address assignment for dial-out access to the network 15 involves interaction with internal dynamic IP address assignment within the LAN 53.

Dynamic Host Configuration Protocol (DHCP) is a well-recognized technique for dynamically assigning an IP address on a LAN independent of any address assignments out on the public Internet 15. On a network using DHCP protocol, such as the LAN 53, one or more DHCP servers 59 receives requests for IP addresses. When the DHCP server 59 receives such a request, it allocates an IP address for the requesting system from a pool of available addresses. The server 59 sends a DHCPACK message containing the allocated IP address back over the LAN 53 to the requesting system. Each allocated IP address is "leased" to a system on the network 53 for a set time interval. Each active computer system 55 or 57 on the network 53 can renew its assignment of an IP address within the interval. However, any system that fails to periodically renew its address assignment within the allotted time loses the allocation. In that event, the DHCP server 59 returns the allocated IP address to the pool of available addresses.

The IP address administration within the LAN 53 is independent of the NAS 17. The NAS and the AAA server 16 therefore do not have the actual IP address data needed to complete the translation from a domain name for a destination such as web server 55. The NAS 17 and the AAA server 16 will dynamically assign an IP address in a manner similar to the earlier example, except that to reach the web server 55 the NAS must also interact through the dial-up router 51. It may be helpful here to consider a specific example.

In this example, when the web client user types a domain name such as www.name.com for the destination web server 55, the web client computer 11 sends a query containing the text form of the domain name to the DNS server 14, as in the earlier example. The DNS server 14 accesses its internal translation table and again recognizes the need to communicate with the NAS 17 to obtain the necessary IP address for the destination server 55. The DNS server again sends a query message to the NAS.

The NAS 17 sends the name to the AAA server 16, which retrieves a record for the destination user and supplies that record to the NAS. The NAS uses information from the record to initiate a telephone call. To this point, the methodology is essentially similar to that discussed above relative to the dial-out service to the web server 13 in FIG. 1. However, in this example (FIG. 5), when the NAS 17 dials the telephone number corresponding to the domain name, the PSTN network 19 completes the call to the router 51 on the LAN 53.

The NAS 17 now operates as a DNS client and forwards a query through the router 51 and the LAN 53 to the DHCP server 59 or to a local DNS server (not shown). The DHCP server 59 sends back the internal IP address assigned to the destination. The assigned address could be used on the Internet, but preferably, the NAS 17 performs a translation between a dynamically assigned address used on the public Internet and the internal IP address assigned on the LAN 53.

The NAS 17 now knows the name and the IP address temporarily assigned to the destination system 55 for use on the Internet, as well as the IP address of that system used through the router 51 and the LAN 53. The NAS 17 can now supply the Internet IP address to the source system 11 that initially requested the domain name translation, preferably through the communications via the DNS server 14. The client computer 11 can now use that address to send one or more message packets through the Internet 15 to the NAS 17. The NAS 17 translates the public network IP address into the private network IP address and forwards the packet over the dial-up link through the PSTN 19 to the router 51. The router in turn forwards each IP packet over the LAN 53, with the appropriate internal IP address, for receipt and processing by the destinations computer system 55. An inverse procedure applies to packets sent from the web server 55 to the web client computer 11. In particular, the NAS 17 translates the source IP address from the internal address to the public IP address temporarily assigned through the NAS.

When the DNS server 14 receives the response message from the NAS 17, the DNS server may temporarily update its translation tables for the destination, as in the earlier example, to allow direct translations by that server, while the web server 55 remains on-line through the PSTN 19 and the NAS 17. When the call between the router 51 and the NAS 17 is taken down for any reason, the NAS recognizes this event and withdraws the address assignment to the destination system 55. As part of this operation, the NAS 17 will return the address to the pool of available addresses for future use by the same or other user systems accessing the Internet through the NAS 17 and the NAS will delete its internal translation record used for the translations between the internal IP address and the public Internet IP address. The NAS also signals the DNS server 14 through the Internet 15, to inform that server that the address assignment is no longer valid. The DNS server 14 updates its translation table, to restore the entry for the domain name of the computer system 55 to its original "off-line" condition.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A network access server, comprising:
   a packet network interface, for coupling to and communication of data via a packet switched data network;
   a telephone network interface in communication with the packet network interface, for connection to and communication of the data through a switched telephone network;
   a programmable controller coupled to the network interfaces for controlling data communications through the network interfaces;
   a telephone network interface in communication with the packet network interface, for
   a memory coupled to the programmable controller for storing program code executable by the programmable controller; and
   executable code stored in the memory, wherein execution of the code by the programmable controller causes the network access server to:
      receive a name translation query, via the packet network interface, for a name associated with a destination computer system accessible from the network access server via the switched telephone network;
      establish a dial-out link from the telephone network interface through the switched telephone network to the destination computer system associated with the name and initiate data communication via the dial-out link with the destination computer system;
      temporarily assign a packet network address to the destination computer system from among a pool of addresses available to the network access server; and
      send a response to the query via the packet network interface, the response containing the temporarily assigned packet address as a translation of the name.

2. A network access server as in claim 1, wherein execution of the code by the programmable controller further causes the network access server to pass data packets bearing the assigned address through the network interfaces between the packet switched data network and the dial-out link to the destination computer system.

3. A network access server as in claim 1, wherein execution of the code by the programmable controller causes the network access server to communicate packets associated with the destination computer system over the dial-out link using a local packet address of a node within the destination computer system and to translate between the local packet address and the assigned address, to enable communication of the packets associated with the destination computer system via the packet network interface.

4. A network access server as in claim 1, wherein the name comprises a domain name associated with the destination computer system, and the assigned address comprises an Internet Protocol address.

5. A network access server as in claim 4, wherein the network access server receives the name translation query from a domain name server and sends the response to the domain name server.

6. A network access server as in claim 1, wherein the packet network interface comprises an Internet Protocol interface, and the telephone network interface comprises one or more modems.

7. A network access server as in claim 1, wherein execution of the code by the programmable controller further causes the network access server to contact an authentication, authorization and accounting server to check a user record before completing the assignment of the address to the destination system.

8. A domain name translation system comprising:
   a programmable computer;
   a packet network interface, for coupling to and communication via a packet switched data network to enable communication of messages relating to name translations;
   a database of domain name translations;
   a memory coupled to a processor of the programmable computer for storing program code executable by the processor; and
   executable code stored in the memory, wherein execution of the code by the processor causes the programmable computer to:
      receive a translation query containing domain name, from a communication source, via the packet network interface;
      attempt to retrieve a translation record corresponding to the received domain name from the database;
      recognize from the attempt that the received domain name relates to a destination accessible via a dial-out link through a telephone network;
      send a message containing the received domain name, via the packet network interface, to a network access server capable of establishing the dial-out link through the telephone network to the destination;
      receive a packet network address, temporarily assigned to the destination, from the network access server via the packet network interface; and
      supply a response message via the packet network interface to the communication source, the response message containing the packet network address temporarily assigned to the destination.

9. A system as in claim 8, wherein the execution of the code by the processor further causes the programmable computer to update a translation record corresponding to the received domain name within the database to include the packet network address temporarily assigned to the destination, in response to receipt thereof from the network access server.

10. A system as in claim 8, wherein the execution of the code by the processor further causes the programmable computer to update the translation record corresponding to the received domain name within the database to delete the packet network address temporarily assigned to the destination, in response to receipt of a message indicating that assignment to the destination is no longer valid.

11. A system as in claim 8, wherein the packet network address temporarily assigned to the destination comprises an Internet Protocol address.

12. A software product, comprising:
   a machine readable medium for bearing information; and
   executable code carried as the information on the machine readable medium, the executable code forming a control program for a network access server coupled between a packet-switched data network and a telephone network, wherein execution of the control program by a processor of the network access server causes the network access server to perform the steps of:
      receiving a name translation query from the packet-switched data network, for a name associated with a destination computer system accessible from the network access server via the telephone network;

establishing a dial-out link through the telephone network to the destination computer system associated with the name;

initiating data communication via the dial-out link with the destination computer system;

temporarily assigning a packet network address to the destination computer system from among a pool of addresses available to the network access server; and sending a response to the query via the packet-switched data network, the response containing the temporarily assigned packet address as a translation of the name.

13. A software product as in claim 12, wherein execution of the control program by a processor of the network access server causes the network access server to perform the further step of passing data packets bearing the assigned address between the packet-switched data network and the dial-out link to the destination computer.

14. A software product as in claim 12, wherein execution of the control program causes the network access server to perform the further step of processing packets for communication to or from the destination system to translate address data in the packets between the assigned address and a local address used by a node within the computer system.

15. A software product, comprising:

a machine readable medium for bearing information; and executable code carried as the information on the machine readable medium, the executable code forming a control program for a computer system coupled to a packet switched data network, the control program causing the computer system to perform the following steps when a processor of the computer system executes the code:

receiving a translation query containing a domain name via the packet switched data network;

recognizing that the received domain name relates to a destination accessible via a dial-out link through a telephone network;

sending a message containing the received domain name through the packet switched data network to a network access server capable of establishing the dial-out link through the telephone network to the destination;

receiving a packet network address, temporarily assigned to the destination, from the network access server; and supplying a response message via the packet switched data network to a source of the translation query, the response message containing the packet network address temporarily assigned to the destination.

16. A software product as in claim 15, wherein the execution of the code by the processor causes the computer system to perform the further step of updating a translation record corresponding to the received domain name within the computer system to include the packet network address temporarily assigned to the destination, in response to receipt thereof from the network access server.

17. A software product as in claim 16, wherein the execution of the code by the processor causes the computer system to perform the further step of updating the translation record to delete the packet network address temporarily assigned to the destination, in response to receipt of a message via the packet switched data network indicating that assignment to the destination is no longer valid.

18. A method of establishing a connection of a computer system and a network access server coupled between a packet-switched data network and a telephone network, the method comprising the steps of:

receiving a name translation query from the packet-switched data network, for a name associated with a destination computer system accessible from the network access server via the telephone network;

establishing a dial-out link through the telephone network to the destination computer system associated with the name;

initiating data communication via the dial-out link with the destination computer system;

temporarily assigning a packet network address to the destination computer system from among a pool of addresses available to the network access server; and sending a response to the query via the packet-switched data network, the response containing the temporarily assigned packet address as a translation of the name.

19. A method as in claim 18, further comprising the step of passing data packets bearing the assigned address between the packet-switched data network and the dial-out link to the destination computer.

20. A method as in claim 18, further comprising the step of processing packets for communication to or from the destination system to translate address data in the packets between the assigned address and a local address used by a node within the computer system.

* * * * *